United States Patent Office 3,118,816
Patented Jan. 21, 1964

3,118,816
N-SUCCINYL HEPARIN AND PROCESS
Ira B. Cushing, Lake Bluff, Ill., assignor to Abbott Laboratories, North Chicago, Ill., a corporation of Illinois
No Drawing. Filed Apr. 3, 1962, Ser. No. 184,658
5 Claims. (Cl. 167—74)

INTRODUCTION

The present invention relates to N-succinyl heparin and a method for its production. It also refers to a method of enhancing clearing factor enzyme activity in warm-blooded animals without prolonging the blood-clotting time for said animals.

Heparin is a relatively long-known polysaccharide used in the treatment of various physiological deficiencies. The more prominently known activities of heparin are the clearing factor lipase activating power and the anticoagulation effect it has on the blood of warm-blooded animals.

Clearing factor enzyme is that enzymatic activity which breaks up or "clears" fat globules from blood serum. As a substrate, ordinary triglycerides suffice. It is not necessary that lipoprotein actually be present. However, it is observed in vivo that, along with the hydrolysis of glycerides, there occurs a shift of lipoproteins from higher to lower molecular weights.

When blood plasma containing no clearing factor enzyme is combined with a fat emulsion, the fat globules remain intact, but when the blood plasma contains clearing factor enzyme the fat globules are broken down to yield free fatty acids and glycerol. The activating power of heparin or any derivative of heparin can be measured by determining the ability of the compound in question to cause the release of clearing factor lipase into the circulation. To determine the degree of enzyme activity, one can titrate the amount of fatty acids freed, or the density change of the blood plasma sample mixed with the fat emulsion can be determined optically.

The anticoagulant activity is that phenomenon which prevents or delays the coagulation of blood, and compounds with this property are useful for the treatment of various circulatory conditions in warm-blooded animals. Although the anticoagulant effect of sodium heparin is desirable in the treatment of intravascular clotting, this effect may become hazardous in the prolonged treatment of hyperlipemia and/or hypercholesterolemia for which sodium heparin is presently used. A compound which would effect lipemia clearance and cholesterol lowering without jeopardizing patients by the interference with the blood-clotting mechanism would abolish the fear on the part of the physician and make such therapy accessible to more patients.

OBJECTS OF THE INVENTION

It is an object of the present invention to provide a clearing factor lipase which is substantially free of anticoagulant activity. It is another object of the present invention to provide a method for manufacturing a physiologically acceptable compound which has clearing factor activity substantially free of anticoagulant activity. A further object of the present invention is the manufacture of N-succinyl heparin. Other objects will be apparent from the following specification and appended claims.

STATEMENT OF INVENTION

The above objects are accomplished by replacing from 25 to 35% of the sulfate groups which are linked to the nitrogen atoms in the glucosamine of heparin with succinyl groups. This is accomplished by selectively hydrolyzing some of the sulfamide links of heparin and reacting the amino groups freed in this step with succinic acid.

METHOD OF INVENTION

In a simple embodiment, heparin is refluxed with dilute hydrochloric acid; the reaction mixture is neutralized, and thereafter stirred with succinyl chloride in the presence of an organic, water-immiscible solvent and an acid binder, e.g., sodium hydroxide, sodium carbonate, potassium bicarbonate, etc. The formed N-succinyl heparin remains in the aqueous phase and after separating the latter from the organic phase, it can be separated therefrom at a pH slightly below 7.

The hydrolysis referred to above is carried out according to known procedures, e.g., the method reported by Charles and Todd in the Biochemical Journal, volume 34, pages 114–5 (1940). The hydrolysis step is continued until the heparin has lost 25–35% or its original sulfate groups which can easily be assayed by known methods. Heparin is usually hydrolyzed in aqueous acid solutions, whereby dilute mineral acids are mostly used. The time and temperature used in the hydrolysis step determine the amount of cleavage of sulfate groups which is also a measure for the deactivation of the anticoagulation activity of heparin, since this activity goes hand in hand with the proportion of sulfate groups on the glucosamine nitrogens of heparin. The free glucosamine nitrogens obtained by hydrolysis are those which will be succinylated by reacting the modified heparin with a succinyl halide.

To measure chemically the number of succinyl residues introduced into heparin, the number of free amino groups of inactivated (hydrolyzed) heparin are measured and compared with the number of free amino groups of succinylated heparin. By comparison of these two values it is easily established that substantially all free amino groups in inactivated heparin have been succinylated.

For the purpose of the present invention, any heparin containing from 25% to 35% of succinyl groups is hereinafter referred to as N-succinyl heparin. These N-succinyl heparins have the desired physiological activity of being suitable agents for clearing factor lipase activating effect without having the undesirable anticoagulant effect of native heparin. Heparins in which 25% to 35% of the original sulfate groups have been removed from the glucosamine nitrogens are sufficiently inactivated as anticoagulant, and this activity is not restored by succinylating these nitrogens in the reaction with succinyl chloride. Heparins with less than 25% succinyl radicals are still of high anticoagulant potency, while heparins in which more than 35% of the glucosamine nitrogens carry succinyl groups also have lost a portion of the potential clearing factor activating potency. Thus, it is an essential part of this invention that native heparin is modified with succinyl radicals within the range set forth above.

Among the main advantages of the new N-succinyl heparin is the fact that it is of extremely low toxicity, and that the introduced succinyl group represents a radical which is not foreign to the body of warm-blooded animals. In these respects, the compound of the present invention differs very distinctly and advantageously from other derivatives of heparin that have been proposed in the past. A further advantage of the new compound is that it contains additional free carboxylic acid groups through whose presence the new compound more closely resembles the strong acidity of the native heparin.

TESTING PROCEDURES (a) *Dose Response Test for Clearing Factor*

Exactly 10 minutes after injecting the test animal intravenously with the test compound, 5 ml. of blood are withdrawn from the test animal by cardiac puncture or venipuncture. The blood is pulled into a syringe which has previously been wetted with a 1.0% aqueous solution of sodium oxalate. The blood is then transferred into a test tube containing 0.3 ml. of a 1.0% sodium oxalate solution at 0° C. Another 0.2 ml. of the same sodium oxalate solution is added. The tube is gently rotated to mix the contents and subsequently centrifuged for 20 minutes at 4° C. Of the supernatant clear plasma, 1.0 ml. is withdrawn and combined with 0.1 ml. of a safflower oil emulsion containing 1% fat globules. After an incubation time of 2 hours at room temperature, 5.0 ml. of Dole's extraction mixture (40 parts isopropanol, 10 parts n-heptane and 1 part N sulfuric acid) is added. This is followed by the addition of 3.0 ml. n-heptane and 2.0 ml. distilled water. The mixture is shaken for 15 minutes and the organic layer is separated. Four milliliters of this organic layer is washed with an equal volume of 0.05% sulfuric acid and then centrifuged at room temperature for 15 minutes at 200 G (G represents the earth's gravitational force). To 2.0 ml. of the clear extract, 0.5 ml. of Thymol Blue (0.01% in ethanol) is added and nitrogen gas is bubbled through the solution for 30 seconds. The solution is then titrated with 0.01 N sodium hydroxide to the first permanent discoloration from yellow to blue-green.

(b) *Duration Test for Clearing Factor Activity*

The test animals are injected intravenously with a given amount of test compound and blood is withdrawn at specified intervals. The test is otherwise identical as the one described above.

(c) *Anticoagulation Test*

With a dry syringe, 5 ml. of blood are taken from the test animal and 1.0 ml. of this blood is placed in each of three test tubes. The first test tube is gently tilted every 30 seconds and after clotting occurs in this sample, the second tube is gently tilted every 30 seconds until this sample clots, whereupon the third tube is gently tilted every 30 seconds until clotting occurs. The time interval between the withdrawal of blood from the animal and the clotting of the third test tube content is used as the clotting time for the specific blood sample.

The blood samples are taken from the animals at varying time intervals after injection with the test compound. The clotting time for the blood is also tested prior to the injection of the test compound as an indication of the normal clotting time for the blood of the specific animal.

PREPARATION OF N-SUCCINYL HEPARIN 250 g. sodium heparin with an anticoagulation activity of 160 U.S.P units/mg. is refluxed 2½ hours with 4.9 liters of 0.086 N hydrochloric acid. After cooling, the solution is neutralized to a pH of 7 with sodium hydroxide. Assaying this neutral solution for its anticoagulation power shows that its activity is substantially destroyed.

To the above solution, 200 g. of sodium bicarbonate and one liter of benzene is added, followed by the dropwise addition of 62.5 ml. of succinyl chloride dissolved in 250 ml. of benzene. The mixture is stirred for several hours at room temperature and subsequently the aqueous layer is separated therefrom. The organic layer is washed with two small portions of water and this wash liquor is combined with the above aqueous layer. The aqueous solution is adjusted to pH 6.5 with dilute hydrochloric acid and two volumes of ethanol are added, followed by a saturated aqueous sodium chloride solution in an amount sufficient to make the final concentration of sodium chloride 0.3 weight percent of volume (w./v.) of the aqueous alcoholic mixture. A gummy precipitate of N-succinyl heparin settles. The supernatant is decanted after a suitable waiting period.

The precipitate is redissolved in water and purified from other organic materials by passing it through an ion exchange column filled with an organic resin containing quaternary nitrogen groups in the hydroxy form. The alkaline aqueous solution obtained is adjusted with concentrated hydrochloric acid to a pH of 6.5. After adding two volumes of ethanol, sufficient concentrated aqueous sodium chloride solution is added to bring the total sodium chloride content of the mixture to 0.3% w./v. After the precipitate of N-succinyl heparin settles, the supernatant is decanted. To the moist precipitate, about ½ volume of absolute ethanol is added to harden the precipitate which is then filtered and washed on the filter first with acetone and subsequently with ether. In this manner, 244 g. of N-succinyl heparin is obtained.

A biological assay of this material shows that it has an in vitro anticoagulation activity of 7 U.S.P. units/mg. Chemical analysis of the obtained compound shows that 30% of its glucosamine nitrogens are now substituted with the succinyl radical.

By prolonging the hydrolysis step of this example to 3 hours and otherwise proceeding as described above, 35% of the sulfate groups of the native heparin are replaced by succinyl groups. On the other hand, when hydrolysis under reflux is interrupted after 2 hours, only 25% of the sulfate groups of native heparin are replaced by the succinyl residue.

TEST RESULTS

I. *Clearing Factor; Duration*

A group of dogs injected intravenously with N-succinyl heparin (30% succinyl groups) and native heparin (160 U.S.P. units/mg.) respectively was used for the test described under (b) above. Each dog received either 0.6 mg./kg. of N-succinyl heparin or 0.6 mg./kg. of sodium heparin. The following titration results were obtained by taking blood samples at the time intervals specified in the following table:

TABLE 1

| Time | N-Succinyl heparin, 0.01 N NaOH/ml. of plasma | Sodium heparin, 0.01 N NaOH/ml. of plasma |
| --- | --- | --- |
| 10 minutes_____ml__ | 0.223 | 0.194 |
| 30 minutes_____ml__ | 0.224 | 0.195 |
| 60 minutes_____ml__ | 0.175 | 0.142 |

From this table it will be seen that the clearing factor activity of N-succinyl heparin is somewhat better than that of sodium heparin, both in degree of activation and duration of action.

In a similar test with rats injected subcutaneously with 1 mg./kg. of each of the above test compounds, the following results were obtained with the test described under (b) above:

TABLE 2

| Time | N-Succinyl heparin, 0.01 N NaOH/ml. of plasma | Sodium heparin, 0.01 N NaOH/ml. of plasma |
| --- | --- | --- |
| 10 minutes_____ml__ | 0.266 | 0.279 |
| 30 minutes_____ml__ | 0.223 | 0.269 |
| 45 minutes_____ml__ | 0.139 | --------- |
| 60 minutes_____ml__ | 0.032 | 0.241 |
| 120 minutes_____ml__ | 0.033 | 0.071 |

From this table it will be seen that N-succinyl heparin has substantially the same clearing factor activity initially as does sodium heparin, but that in this species of animal its effect is of slightly shorter duration with this route of administration.

II. *Dose Response for Clearing Factor*

From tests carried out on groups of rats with various doses of sodium heparin and N-succinyl heparin respectively, injected intravenously according to the above described test (a), the following titration results were obtained with a 0.01 N sodium hydroxide solution:

TABLE 3

| Dose | N-Succinyl heparin, ml. | Sodium heparin, ml. |
|---|---|---|
| 0.125 mg./kg | 0.057 | 0.228 |
| 0.25 mg./kg | 0.245 | 0.260 |
| 0.50 mg./kg | 0.266 | 0.281 |

From this test and others carried out in the same fashion, it was established that in rats at doses below 0.25 mg./kg., the clearing factor lipase activating power of N-succinyl heparin is substantially lower than that of sodium heparin, but at doses of 0.25 mg./kg. and above, no substantial difference is observed in the clearing factor activity of the two compounds tested.

III. *Anticoagulation Effect*

In an effort to illustrate the great difference in anticoagulating power between N-succinyl heparin and native heparin, tests according to the above procedure (c) were performed on dogs which were injected intravenously with 6 mg./kg. of N-succinyl heparin or 0.6 mg./kg. of sodium heparin respectively. The test results, with various time intervals elapsed between injection and blood sample withdrawal, were as follows:

TABLE 4

| Time | N-Succinyl heparin, minutes | Sodium heparin, minutes |
|---|---|---|
| 10 minutes | 17.9 | 30 |
| 30 minutes | | 30 |
| 45 minutes | 15.7 | |
| 60 minutes | | 30 |
| 90 minutes | 9.8 | 11.5 |
| 120 minutes | | 7.5 |
| 180 minutes | 10.5 | |

The blood-clotting time of the dogs used in each group before injection averaged 7.6 minutes for the animals tested with N-succinyl heparin and 8.7 minutes for those tested with sodium heparin. This table clearly shows that N-succinyl heparin has only a fraction of the objectionable anticoagulant potency of sodium heparin. The large difference evident from Table 4 is even more striking when it is considered that the results shown were obtained by comparing sodium heparin with a 10-fold dose of N-succinyl heparin. In other words, ten parts of N-succinyl heparin produced only a slight increase of clotting time, while one part of sodium heparin produced a much larger increase.

Tests were simultaneously run on these same animals to obtain the level of clearing factor activity. The same dose of the two test compounds were used and the same blood samples compared by titration with 0.01 N sodium hydroxide.

TABLE 5

| Time | N-Succinyl heparin, ml. | Sodium heparin, ml. |
|---|---|---|
| 10 minutes | 0.225 | 0.194 |
| 30 minutes | | 0.195 |
| 45 minutes | 0.199 | |
| 60 minutes | | 0.124 |
| 90 minutes | 0.115 | 0.044 |

In order to fully appreciate the results shown in Table 5, they have to be read in conjunction with the results shown in Table 4: N-succinyl heparin shows at least as good a clearing factor lipase activator potency as sodium heparin with only a fraction of the anticoagulation effect of the latter.

To show that the above effect is also seen by the subcutaneous route of administration, the following test was run in dogs. In these tests, groups of dogs were injected subcutaneously with 0.6 mg./kg. of sodium heparin and 6.0 mg./kg. of N-succinyl heparin, respectively. The sodium heparin used has a potency of 160 U.S.P. units/mg. while the N-succinyl heparin used has a potency of 10 U.S.P. units/mg. attained by hydrolyzing native heparin for 2 hours and 30 minutes before treating it with succinyl chloride according to the procedure described above. The blood samples were withdrawn at times indicated in the table below, with the 0-time showing the respective results before injection of the test compound. In Table 6, the columns headed by "a" refer to N-succinyl heparin and the columns headed by "b" refer to sodium heparin. Again the figures for "clearing factor" refer to N 0.01 sodium hydroxide.

TABLE 6

| Time | Clearing Factor | | Anticoagulant Activity | |
|---|---|---|---|---|
| | a, ml. | b, ml. | a, min. | b, min. |
| 0 minutes | | | 5 | 6 |
| 30 minutes | 0.112 | 0.079 | 6 | 12 |
| 60 minutes | 0.115 | 0.081 | 6 | 12 |
| 120 minutes | 0.098 | 0.075 | 6 | 9 |
| 240 minutes | 0.086 | 0.069 | 5 | 8 |

This table shows that the clearing factor lipase activity of N-succinyl heparin is somewhat greater than that of sodium heparin. On the other hand, the anticoagulant activity of sodium heparin shows a distinct rise over the result on untreated animals, while N-succinyl heparin produces no change of coagulation time.

TOXICITY

In a standard toxicity test in mice, it was established that sodium heparin has an intravenous $LD_{50}$ of about 0.9 g./kg. while the $LD_{50}$ for N-succinyl heparin was found to be 2.3 g./kg. This shows that N-succinyl heparin is even less toxic than sodium heparin which has always been considered a substance of very low toxicity. In this test, ten mice were used for each dose level to establish the $LD_{50}$.

While the above toxicities are based on the tolerance of single doses of the test compounds, toxicity was also measured in another testing program whereby six dogs were injected subcutaneously three times per week with 5 and 30 mg./kg. respectively (three dogs in each group) for a period of 15 months. Even after this prolonged chronic toxicity test, no signs of toxicity were observed on the test animals. This shows the low toxicity of N-succinyl heparin even on such prolonged use.

The new compound to which the present invention refers is shown to be of low toxicity and therefore safe for application to warm-blooded animals. The new compound, N-succinyl heparin, has substantially the same clearing factor lipase activating power as does sodium heparin, but has a much lower anti-coagulant activity than its most closely related substance. The new compound is of great importance for the treatment of hyperlipemia and hypercholesteremia of dietary or hereditary origin. For such and similar ailments, a daily dose of between 0.5 mg./kg. and 5 mg./kg. is indicated, with a preferred range being 1 to 3 mg./kg. Such a dose will give the desired results in clearing factor activity and lies far below the level where any toxicity can be ascribed to the new compound. In fact, from tests in dogs and rats it appears that the therapeutic index lies between 2300 and 7000, depending on the route of administration.

Others may practice the invention in any of the numerous ways which will be suggested to one skilled in the art by the present disclosure. All such practice of the invention is considered to be a part hereof provided it falls within the scope of the appended claims.

I claim:
1. An N-succinyl heparin wherein between 25% and 35% of the glucosamine nitrogen atoms of heparin are substituted with the succinyl radical.
2. The method of administering to warm-blooded animals between 0.5 and 5.0 mg./kg. of the N-succinyl heparin of claim 1.
3. The process of preparing the N-succinyl heparin of claim 1, comprising the steps of
   hydrolyzing heparin until 25% to 35% of the sulfate groups of heparin are cleaved in the presence of a strong, dilute mineral acid,
   neutralizing the reaction mixture, and
   treating said hydrolyzed heparin with succinyl chloride.
4. The process of claim 3 wherein said treatment with succinyl chloride is carried out in the presence of an organic, water-immiscible solvent and an acid binder.
5. The process of claim 3, wherein said hydrolysis is carried out by refluxing an aqueous solution of heparin in the presence of a dilute mineral acid for a period of from two to three hours.

References Cited in the file of this patent

Velluz: Académie des Sciences, Comptes Rendus, vol. 247, 1958, pages 1521–1523 (Q46 A14).